Dec. 29, 1964    L. O. ERICSON ETAL    3,163,601
FILTER FOR PURIFYING LIQUIDS
Filed May 31, 1962    2 Sheets-Sheet 1
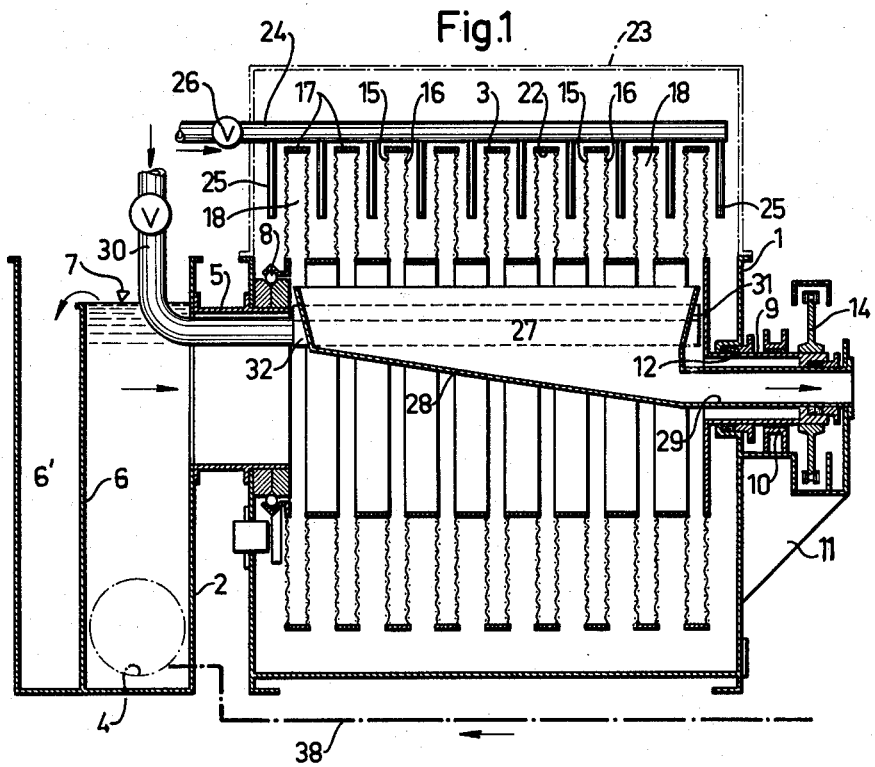
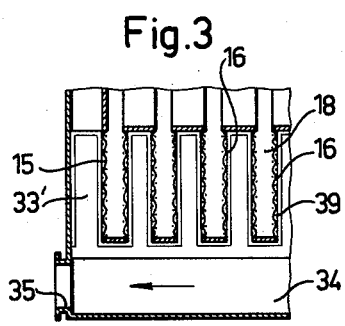
INVENTORS
LARS OLOF ERICSON
HÅKAN CARL JOHAN WENNBERG
OLOV CARL GUSTAV WENNBERG
BY  Young + Thompson
ATTORNEYS

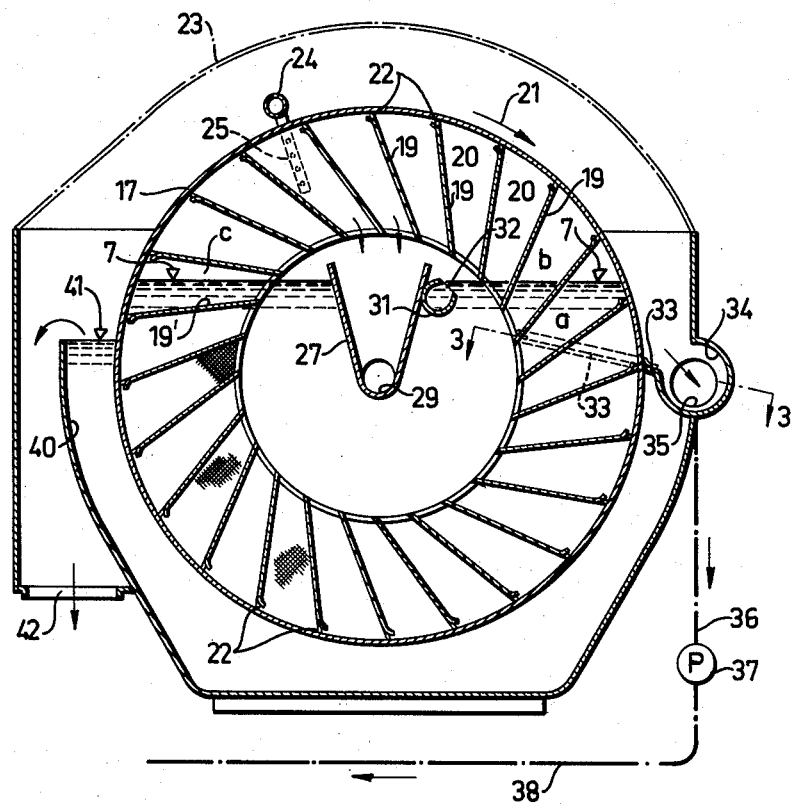

United States Patent Office 3,163,601
Patented Dec. 29, 1964

3,163,601
FILTER FOR PURIFYING LIQUIDS
Lars Olof Ericson, Håkan Carl Johan Wennberg, and Olov Carl Gustav Wennberg, Karlstad, Sweden, assignors to General Engineering Company Aktiebolag Brahevagen, Stocksund, Sweden, a corporation of Sweden
Filed May 31, 1962, Ser. No. 198,919
Claims priority, application Sweden June 2, 1961
8 Claims. (Cl. 210—196)

For purifying liquids, such as raw water, waste water from pulp mills or paper mills and the like, it is common practice to use rotary filters of the drum type comprising a wire screen secured to the drum and wherein filtration takes place while the liquid flows from the inside of the drum out into a surrounding vat. Such filters operate under a comparatively low filtration pressure resulting in the advantage of low mechanical stresses on the drum which practically floats in the liquid. The dum is of fairly simple construction, and removal of the rejected material can be effected by spraying cleaning water on the filter screen. As compared with a drum filter of the kind in which filtration takes place while the liquid flows from an outside surrounding vat inwards into the drum and wherein a strip roll with a scraper has to be used for recovering the rejected material or fibers, a filter of the first-named type can be constructed at a considerably lower cost. However, the low capacity of the filter is an inconvenience, since the filtering area per unit volume of the filter is rather small. The principal object of this invention is to attain an improvement in this respect. The invention also aims at the provision of an effectively operating filter of the drum type of simple construction.

In filters with flow from the outside into a rotary filter drum it is known to increase the filtering area per unit volume of the filter by arranging the filter screen in the form of a number of annular parallel disks which at their outer and inner peripheries are kept together by annular walls. According to the invention, a similar arrangement is applied to a construction wherein the liquid to be filtered flows from inside the drum out through the filter screen and wherein measures are taken to increase the capacity of the filtering operation.

In its broadest aspect the invention is characterized in that the drum has a tubular shaft forming an inlet for unfiltered liquid to a filtration chamber located in the shaft, the disk-like filtration spaces being open to said chamber and divided into a great number of cells by means of partitions which extend obliquely outwards from the shaft of the drum to the peripheral outer wall of the drum such that the outer edges of the partitions of the cells as viewed in the direction of rotation of the drum are backwardly inclined or lagging behind the inner edges of said partitions. The partitions of the cells result in a plurality of advantages. First of all, they form sustaining members for the filter screen, the annular lateral portions of which are preferably bearing on the lateral edges of the partitions. Further, favourable conditions of flow are obtained both at the place where the filter drum moves down into the unfiltered liquid and at the place where the drum emerges from the liquid. Due to these favourable conditions of flow the level of the unfiltered liquid can be comparatively high in the tubular shaft such that the effective filtering area can be maximized.

Liquid can be rapidly drained from the cells and air can be discharged therefrom if the cells communicate with each other at the outer edges of the walls of the cells, especially if the lag of the walls of the cells amounts to at least such an extent that each wall is substantially horizontal when during rotation of the drum it is about to emerge from the unfiltered liquid. At the place where a cell is about to be immersed in the unfiltered liquid, the opening through which the cell communicates with the adjacent cell will be the last to be immersed in the liquid so that all or approximately all of the air has been able to expire from the cell before the cell has been entirely moved below the liquid level. Expiration of air through the filter screen itself is too slow for clearing the cell of the air sufficiently rapidly merely through the screen during immersion of the cell.

Before a filter layer has been built up on the filter screen there is the risk of some fibers or impurities passing through the screen. The inconveniences resulting therefrom may be eliminated by the provision of stationary withdrawing walls at a place of the circumference of the drum in sealing contact with the filter screen and extending into the spaces between the disks for drawing off the initial filtrate into a collecting channel. By means of a return duct or the like this channel may communicate with the inlet for the unfiltered liquid so as to return the initial filtrate for renewed filtration.

Additional features of the invention and advantages obtained thereby will appear from the following description of an embodiment diagrammatically illustrated by way of example in the annexed drawings. FIG. 1 is a vertical axial section of a filter of the drum type devised in accordance with the invention, and FIG. 2 is a corresponding radial section. FIG. 3 is a sectional view of a detail along the line 3—3 in FIG. 2.

In the drawings, numeral 1 denotes a vat for filtered liquid, 2 a feed box for unfiltered liquid and 3 a filter drum located in the vat. The lower part of the feed box 2 has an inlet 4 for unfiltered liquid and the upper part has a lateral connection piece 5 which extends axially into one of the endwalls of the filter drum for the supply of unfiltered liquid to the interior of the drum. The feed box has a partition 6 the top edge of which forms an overflow brim for maintaining a level 7 in the inlet 5 and in the drum. Liquid flowing over the brim is collected in a compartment 6' of the feed box and can be returned therefrom to the inlet 4.

One endwall of the filter drum 3 is by means of a bearing 8 supported by the connection piece 5 which at this place extends through the vat and the endwall of the filter drum. At its other endwall the filter drum is provided with a tubular journal 9 mounted in a bearing 10 which is connected to a bracket 11 on the outside of the vat. A stuffing box 12 serves as a sealing member at the place where the journal 9 extends through the wall of the vat 1. The journal 9 has mounted thereon a sprocket wheel, belt pulley or the like 14 adapted to be driven by an electric motor via a reduction gear, not shown.

The filter screen of the filter drum 3 is composed of annular parallel disks extending in spaced relation radially outwards from the tubular shaft of the filter drum. Each disk consists of a pair of annular parts 15, 16 of the filter screen which parts are interconnected at their peripheries by means of a peripheral wall 17 and between themselves form an annular filtering space 18 open to the interior of the shaft of the drum. Each of these filtration spaces 18 is divided into cells 20 by means of outwardly extending walls 19 that are shown in FIG. 2 but are omitted from FIG. 1 for purposes of clarity. Preferably the walls 19 of the cells are not extending radially outwards, but are obliquely extending outwards from the periphery of the shaft of the drum such that their outer edges are located rearwardly of their inner edges, as viewed in the direction of rotation of the drum indicated by an arrow 21. At their peripheral edges the walls 19 of the cells are recessed to form apertures 22 through which the various cells communicate with each other. As a result thereof, air is prevented from remaining too long in a cell which during rotation of the drum is about to be immersed in the liquid. It should be noted that air can be discharged very slowly only through the filter screen, especially if the screen is tight, whereas due to the recesses 22 air can be rapidly discharged from the cell which is about to be filled to the next following cell or cells via the recesses.

The construction of the filter drum described results in a large effective filtering area within a comparatively confined axial space. The construction also results in the advantage that the filter screen can be easily kept clean and rejected material deposited thereon can be washed off by means of simple devices. An example of such a device is diagrammatically shown in the drawing. Within a cover 23 placed on the vat and indicated by chain-dotted lines in the drawing there is provided a tube 24 which extends parallel to the axis of rotation of the drum. Spray tubes 25 extend from the tube 24 into all of the spaces between the filter screen disks and are provided with apertures for spraying the parts 15 and 16 of the filter screen obliquely inwardly from the outside as shown in FIG. 2. Spray water under pressure is supplied to the tube 24 through a valve 26. Due to the spraying action on the parts 15, 16 of the filter screen rejected material which has collected on the inside thereof will be washed back into the cells at the upper side of the filter drum and will be carried along the walls of the cells downwards into a reject channel 27 which has a comparatively wide opening at the top and extends axially through the drum. The bottom 28 of the channel is inclined toward an outlet tube 29 which communicates with the reject channel and extends outwards through the hollow journal 9 of the drum so that the rejected material can be conveniently discharged. As will be seen from FIGS. 1 and 2, the top edge of the reject channel is located somewhat above the highest liquid level 7 in the filter drum.

Sometimes it is desirable to add coarse fibers to the unfiltered liquid so as to obtain a porous filter layer on the filter screen. To this end, a suspension of coarse fibers can be supplied through a pipe 30 to a nozzle tube 31 having a nozzle opening 32 which extends substantially throughout the whole length of the drum. As shown in FIG. 2, the tube 31 is suitably provided near the reject channel.

Before a filter layer has been built up on the filter screen there is the risk of part of the fibers or impurities passing through the screen. To avoid the ensuing inconveniences the initial filtrate may be returned to the unfiltered liquid. A device for this purpose is shown in FIGS. 2 and 3. This device consists of a withdrawing wall 33 substantially in the form of a comb the teeth 33' of which extend obliquely into the spaces between the filter disks at the discharge sides of the parts 15, 16 of the filter screen. The withdrawing wall 33 which is located somewhat below the liquid level 7 on the side of the filter drum, which during rotation thereof moves down into the liquid, extends from the inner periphery of the drum obliquely downwards to a collecting channel 34 having an outlet duct 35. By means of a conduit 36 the outlet duct 35 communicates with a pump 37 by means of which the collected filtrate can be returned through a conduit 38 to the unfiltered liquid. The teeth 33' of the withdrawing wall 33 may be provided with lateral sealing strips 39 of rubber or other elastic material, which strips are trailing on the filter screen in sealing contact therewith.

On the discharge side of the vat there is provided a wall 40 which forms an overflow brim for the filtrate. As will be seen from FIG. 2, the overflow level 41 is located at a certain distance below the level 7 of the unfiltered liquid in the drum such as to obtain the required liquid head between the inside of the drum and the vat. The outlet for the filtrate is denoted at 42.

If the filter drum rotates in the direction of the arrow 21 shown in FIG. 2, the cells will successively be immersed in the liquid, and their inner parts will first enter the liquid. As shown in FIG. 2, a pair of cells *a* and *b* are just about to be immersed in the liquid. At this moment air is forced out and can leave the cells through the apertures 22 at the outer periphery of the drum. Liquid flows from the interior of the filter drum 18 outwards through the parts 15, 16 of the filter screen between the levels 7 and 41, and impurities and fibers in the unfiltered liquid will be deposited on the inside of the filter screen. The initially discharged filtrate is moved along the withdrawing wall 33 into the collecting channel 34 and returned to the unfiltered liquid for renewed filtration in the manner described above. After a cell has passed from one side of the drum to the other one through the liquid and has come out of the liquid, it will pass the spray tubes 25 for spraying the parts of the filter screen such that the rejected material will be washed down into the reject channel and discharged through the tube 29. A cell *c* to the left in FIG. 2 is just about to emerge from the unfiltered liquid. At this moment, the lower wall 19' of the cell is inclined slightly outwards toward the aperture 22 through which this cell communicates with the underlying cell. This inclination which is due to the backward direction of the walls of the cell results in that the unfiltered liquid will flow toward the aperture 22 which serves as a draining hole. Consequently, the liquid can comparatively rapidly leave the cell during the upward movement thereof out of the liquid, that is, at a rate higher than the rate corresponding to the permeability of the filter screen at that place.

What we claim is:

1. A filter of the drum type for purifying raw water, waste water from pulp mills, paper mills and the like, comprising a vat defining a discharge level for filtered liquid, a rotatable drum in the form of spaced parallel disks composed of spaced lateral walls formed by ring-shaped filter screen parts and of outer and inner peripheral walls interconnecting said screen parts, a tubular shaft carrying said drum and forming an inlet for unfiltered liquid to the interior of the drum, the spaces between said lateral walls of each disk being open inwardly, partitions mounted in said spaces to form inwardly open cells therein, said partitions and said lateral walls bounding said cells and the inward openings of said cells, said partitions extending outwards in relation to the axis of the drum so as to have their outer ends adjacent said outer peripheral wall of the drum, the direction of each partition deviating from the radial direction in such a manner that the outer edge of the partition is lagging behind the inner edge thereof as viewed in the direction of rotation of the drum, said cells communicating with each other adjacent the outer peripheral wall of the drum.

2. A filter as claimed in claim 1 and means defining an inlet level for said unfiltered liquid above said discharge level, each partition extending substantially horizontally at the point in which during the rotation of the drum the partition emerges from the liquid in the drum.

3. A filter of the drum type for purifying raw water, waste water from pulp mills, paper mills and the like, comprising a vat defining a discarge level for the filtered liquid, a rotatable filter drum partly immersed in said vat and forming a filtration chamber for the liquid to be filtered, the filter drum being composed of spaced parallel disks each comprising spaced lateral filtering walls and an outer peripheral wall, the adjacent walls of any of two adjacent disks being interconnected by an inner peripheral wall, tubular shaft portions carrying said drum, one of said shaft portions forming an inlet to the filtration chamber for the liquid to be filtered, means to define an inlet level for said unfiltered liquid above said discharge level, and partitions forming cells in said disks between the lateral filtering walls, said partitions extending at an angle to the corresponding radius of the drum towards the said outer peripheral wall and in such a position that each partition is substantially horizontal at the point during the rotation of the drum in which the same partition emerges from the liquid through said level for unfiltered liquid, said cells communicating with each other adjacent the outer peripheral wall of the drum.

4. A filter as claimed in claim 3, characterized in that said partitions terminate short of said outer peripheral wall so that the cells communicate with each other at the peripheral outer wall of the drum.

5. A filter as claimed in claim 3, and stationary withdrawing walls sealing contact with the filtering walls of the drum and extending into the spaces between the disks for drawing off the initial filtrate, a collecting channel for receiving said initial filtrate, and a return duct forming communication between said collecting channel and the inlet for the unfiltered liquid.

6. A filter as claimed in claim 3 and further characterized by a reject-receiving channel extending axially in one of the tubular shaft portions of the drum, the side walls of said channel projecting above the highest liquid level in the drum.

7. A filter as claimed in claim 3 and further characterized by a reject channel for receiving reject from the inner of the disks and spray tubes for spraying the filtering walls to facilitate movement of the rejected material into the reject channel, said spray tubes being mounted above said reject channel in the spaces between the disks of the drum.

8. A filter according to claim 3, characterized by a reject channel, and circumferentially after the channel a tube open to the cells and adapted for the supply of a filtering material, such as a suspension of coarse fibers.

References Cited in the file of this patent
UNITED STATES PATENTS

| | | |
|---|---|---|
| 622,439 | Bergstrom | Apr. 4, 1899 |
| 893,104 | Schorr | July 14, 1906 |
| 1,685,118 | Campbell | Sept. 25, 1928 |
| 1,826,485 | Thorne | Oct. 6, 1931 |
| 2,022,069 | Whitmore | Nov. 26, 1935 |
| 2,076,104 | Vinton | Apr. 6, 1937 |
| 2,464,223 | Genter | Mar. 15, 1949 |

FOREIGN PATENTS

| | | |
|---|---|---|
| 28,649 | Holland | July 15, 1952 |
| 40,308 | France | June 9, 1932 |

(Addition to No. 647,095)